United States Patent
Lin et al.

(10) Patent No.: US 6,871,260 B2
(45) Date of Patent: Mar. 22, 2005

(54) NON-VOLATILE MEMORY BASED STORAGE SYSTEM CAPABLE OF DIRECTLY OVERWRITING WITHOUT USING REDUNDANCY AND ITS WRITING METHOD

(75) Inventors: Chung I Lin, Hsinchu Hsien (TW); Ellope Shiue, Kaohsiung (TW); Gordon Yu, Taipei (TW)

(73) Assignees: C-One Technology Corporation, Hsin-Chu (TW); Pretec Electronics Corporation, Fremont, CA (US)

( * ) Notice: Subject to any disclaimer, the term of this patent is extended or adjusted under 35 U.S.C. 154(b) by 300 days.

(21) Appl. No.: 10/315,032

(22) Filed: Dec. 10, 2002

(65) Prior Publication Data

US 2004/0019760 A1 Jan. 29, 2004

(30) Foreign Application Priority Data

Jul. 24, 2002 (TW) .......................................... 9116502 A (51) Int. Cl.$^7$ .............................................. G06F 12/00
(52) U.S. Cl. ...................................................... 711/103
(58) Field of Search ................................. 711/103, 154; 714/710, 711

(56) References Cited

U.S. PATENT DOCUMENTS

| 5,226,015 | A | * | 7/1993 | Gotou et al. ............ 365/185.09 |
| 5,539,689 | A | * | 7/1996 | Aoki ...................... 365/185.21 |
| 5,548,554 | A | * | 8/1996 | Pascucci et al. ............. 365/200 |
| 5,566,114 | A | * | 10/1996 | Pascucci et al. ............ 365/200 |
| 6,735,727 | B1 | * | 5/2004 | Lee ............................. 714/711 |

* cited by examiner

Primary Examiner—Kevin L. Ellis
(74) Attorney, Agent, or Firm—Bacon & Thomas PLLC (57) ABSTRACT

A non-volatile memory based storage system capable of directly overwriting without using redundancy and its writing method are provided. The invention first writes data into a register. Then, a portion of MCF information of the decoded logical writing destination address is taken as a physical writing address and used to determine whether there is data in a block corresponding to the physical writing address. If yes, a new swap block is taken out from a swap table and at least one record of data in the register is written into the swap block.

18 Claims, 8 Drawing Sheets

NON-VOLATILE MEMORY BASED STORAGE SYSTEM CAPABLE OF DIRECTLY OVERWRITING WITHOUT USING REDUNDANCY AND ITS WRITING METHOD

BACKGROUND OF THE INVENTION

1. Field of the Invention

The present invention relates to a non-volatile memory based storage system and its writing method and, more particularly, to a non-volatile memory based storage system capable of directly overwriting without using redundancy and its method, so as to increase the data access efficiency.

2. Description of Related Art

Typically, an erasing operation for deleting a previously recorded data is required prior to writing data into a flash memory. Thus, a relatively long period of time is required for data writing. This is a drawback of the flash memory. Therefore, there is a need to develop a non-volatile memory capable of being overwritten without the erasing operation. It is envisaged that such non-volatile memory can increase an access efficiency of data.

For writing data into the flash memory, a plurality of blocks in the flash memory are employed as a writing unit. Generally, several bytes at the end of each block is taken as a redundancy field for recording a data writing status of the block and information related to other blocks. As such, it is required to check the redundancy of a target block prior to writing data into the same, resulting in an increase of writing time. Furthermore, the available space for writing data into a block is undesirably reduced because the redundancy occupies a portion of the limited storage space of each block to be written.

Therefore, it is desirable to provide a novel non-volatile memory based storage system capable of directly overwriting without using redundancy and its writing method in order to mitigate and/or obviate the aforementioned problem.

SUMMARY OF THE INVENTION

The object of the present invention is to provide a non-volatile memory based storage system capable of directly overwriting without using redundancy and its method, which can save time in writing data into non-volatile memory and prevent data from losing in case of an unexpected event while writing.

In one aspect of the present invention, a non-volatile memory based storage system capable of directly overwriting without using redundancy comprises: at least one non-volatile memory including a plurality of blocks wherein at least one block is stored with a system management table having a plurality of mapping control field (MCF) tables, each having a plurality of MCFs; and a register for storing at least one target data to be written into said at least one non-volatile memory, the register including a temporal MCF table having at least one MCF of the system management table; wherein a host executes a writing command to write said at least one target data into said at least one non-volatile memory and the writing command includes a target MCF number for writing said at least target data into said at least one non-volatile memory based on a target MCF of the temporal MCF table corresponding the target MCF number.

In another aspect of the present invention, there is provided a writing method for allowing a host to directly overwrite a non-volatile memory based storage system without using a redundancy. The storage system includes a register and at least one non-volatile memory having a plurality of blocks. The at least one block is used for storing a system management table including a plurality of mapping control field (MCF) tables, each having a plurality of MCFs, a table attribute (TA), a MCF table flag (MTF), a MCF table number (MTN), a MCF group number (MGN), and a plurality of swap block addresses, each MCF having a mapping physical block address (MPBA). The register having a temporal MCF table including at least one MCF of the system management table. The writing method comprises the steps of: (A) decoding a writing command from the host to obtain a logical writing destination address corresponding to the writing command wherein the logical writing destination address comprises the MCF number (MCFN) of a target MCF; (B) writing target data from the writing command into the register; (C) if the target MCF does not exist in the temporal MCF table, directly searching at least one MCF table containing the target MCF in the system management table based on a temporal MCF index table and a plurality of MGNs, and loading the at least one MCF table into the temporal MCF table; (D) taking the MPBA of the target MCF as a physical writing address of the at least one non-volatile memory; (E) if no data exists in at least one block corresponding to the physical writing address, writing at least one target data stored in the register into at least one block corresponding to the physical writing address; and (F) if data exists in at least one block corresponding to the physical writing address, taking at least one swap block out via at least one swap block address, writing said at least one target data stored in the register into said at least one swap block, and updating the temporal MCF table by the at least one swap block address.

Other objects, advantages, and novel features of the invention will become more apparent from the detailed description when taken in conjunction with the accompanying drawings.

DETAILED DESCRIPTION OF THE PREFERRED EMBODIMENTS

Figure 1:
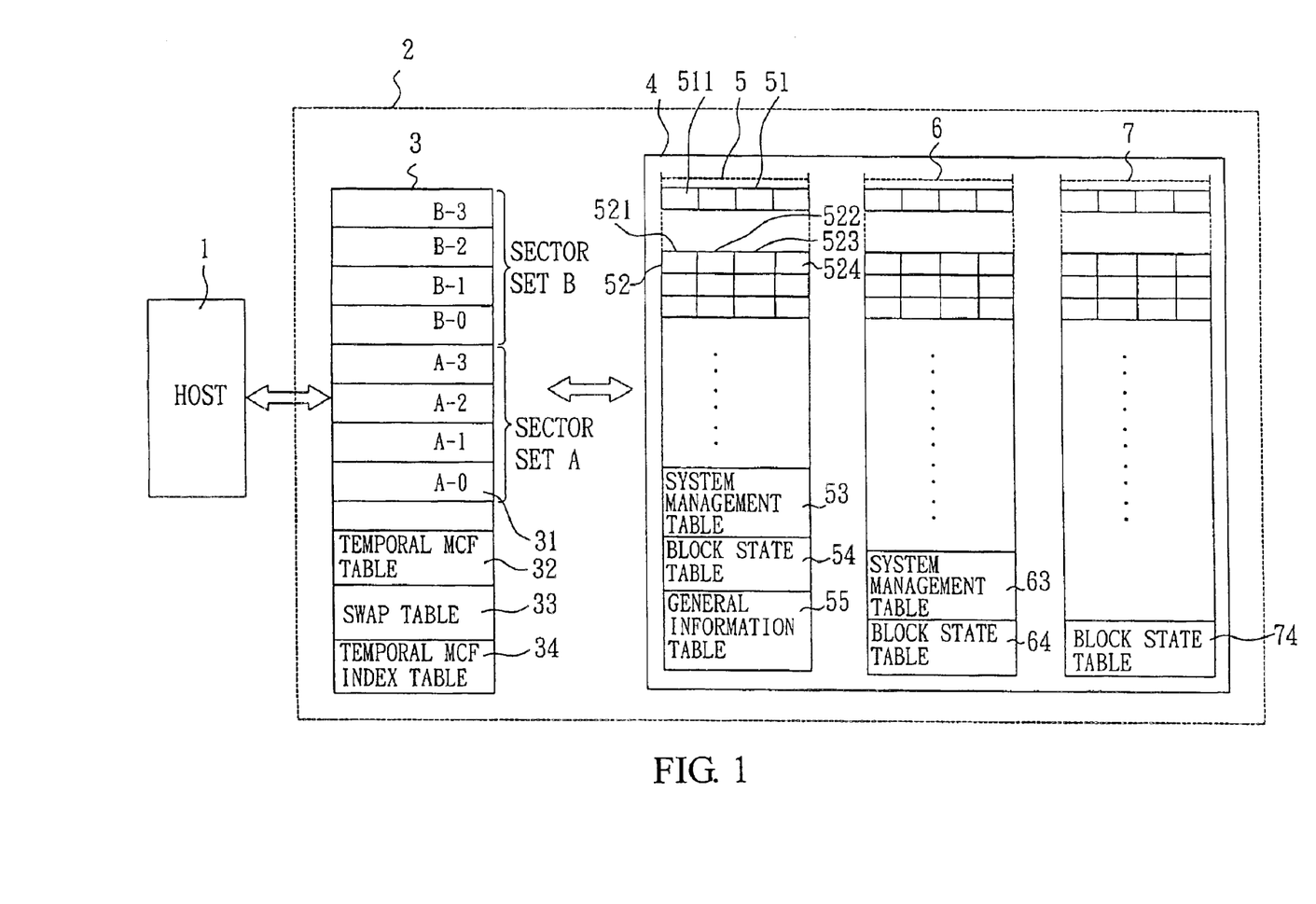
FIG. 1 is a block diagram schematically showing a system structure according to the invention.

With reference to FIG. 1, there is shown a schematic diagram of a structure according to the invention comprising a host 1 and a storage system 2. The host 1 is implemented as a computer having a microprocessor or a controller, or portable device (e.g., notebook, personal digital assistant (PDA)). The storage system 2 comprises a register 3 and a non-volatile memory module 4. The register 3 comprises a first sector set A and a second sector set B. Each sector set comprises a plurality of sectors 31. In this embodiment, preferably each sector set comprises four sectors 31.

The register 3 further comprises a mapping control field (MCF) table 32 and an extension table which can be a swap table 33 or a temporal MCF index table 34. The register 3 may be implemented as one of a variety of forms of storage. In this embodiment, preferably the register 3 is a random access memory (RAM).

The non-volatile memory module 4 comprises a plurality of non-volatile memory sections. In this embodiment, the non-volatile memory module 4 comprises non-volatile memories 5, 6, and 7. The first non-volatile memory 5 comprises at least one data registers 51, a plurality of data blocks 52, a plurality of swap blocks 53, a system management table 54 occupying at least one block, a block state table 55 for recording a state (e.g., good or bad) of all blocks in the first non-volatile memory section 5, and a general information table 56 for storing parameters about system operations and MCF group index table. A detail about data format of the temporal MCF index table 34 will be described hereinafter.

In this embodiment, preferably the first non-volatile memory 5 comprises a data register 51 which preferably has four pages 511. Each data block 52 of the first non-volatile memory 5 preferably has four pages 521, 522, 523, and 524, each having a size equal to that of the sector 31 of the register 3 and equal to that of a page 511 of the data register 51. The non-volatile memory module 4 may be embedded into a portable device or assembled in a portable multimedia storage card, such as a Personal Computer Memory Card International Association (PCMCIA) card or a Security Digital (SD) card.

The second and third non-volatile memories 6 and 7 have their own block state tables 64 and 74, respectively. The second non-volatile memory section 6 can be stored with a part of the system management table 63 if the system management table 54 is too large to be stored in the first non-volatile memory 5. Furthermore, if the system management table 63 is still too large to be stored in the second non-volatile memory 6, the remaining portion of the system management table 63 can be stored in the third non-volatile memory 7. The system management table 54 comprises a plurality of MCF tables, i.e., a MCF table group including MCF table 0, MCF table 1, MCF table 2, . . . , MCF table n. The fields and functions of the MCF tables are describes as follows.

Figures 2A, 2B:
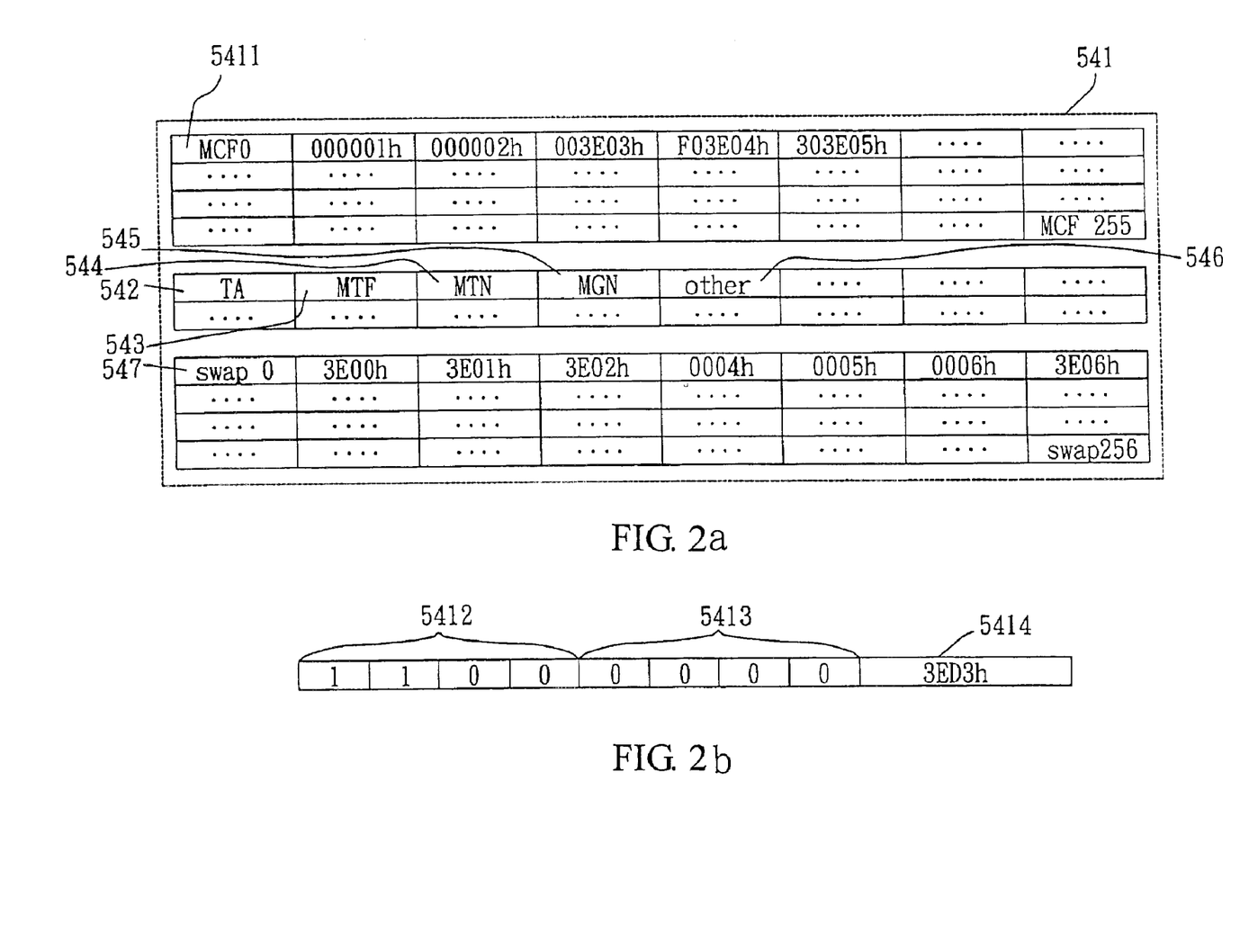
FIG. 2a is diagram of a first configuration of a mapping control field (MCF) table according to the invention.
FIG. 2b is a diagram of data format of the first configuration of the MCF according to the invention.

With reference to FIG. 2a, there is shown a diagram of a first configuration of a MCF table according to the invention. The MCF table 541 (e.g., MCF table 0) comprises a plurality of MCFs 5411, a table attribute (TA) 542, a MCF table flag (MTF) 543, a MCF table number (MTN) 544, a MCF group number (MGN) 545, other information 545, and a plurality of swap block addresses 547.

With reference to FIG. 2b, there is shown the data format of the MCF according to the invention. The MCF comprises a data unit state (DUS) 5412, a mapping device number (MDN) 5413, and a mapping physical block address (MPBA). In this embodiment, preferably MCF table 541 has 256 MCFs 5411.

Each MCF 5411 has a MDN 5413 for directly corresponding to one of the non-volatile memories 5, 6, and 7. As a result, it is able to save time and thus increase the efficiency of writing data into a corresponding device. For instance, a MCF 5411 corresponds to the first non-volatile memory 5 if MDN=0, and corresponds to the second non-volatile memory section 6 if MDN=1. Each MCF 5411 further corresponds to a swap block address 547. For example, MCF0 directly corresponds to Swap 0. Also, the swap block address 547 can be recycled. Moreover, each MCF 5411 can correspond to a plurality of swap block addresses 547.

The TA 542 represents an attribute of the MCF table 541 (see FIG. 2a). For instance, the TA 542 being 'M' represents a MCF table 541. The TA 542 being 'B' represents a block state table 55. The TA 542 being 'G' represents a general information table 56. The MTN 544 represents a number of the MCF table 541, such as MCF 0, MCF 1, . . . , MCF N.

The MTF 543 is used to remark the MTN 544 for solving the problem of two identical MTNs 544 appearing in the MCF table 541. An algorithm of remarking will be described hereinafter. The MGN 545 represents a MCF group associated with the MCF table 541. Notation 'other' 546 represents other information about the MCF table 541 or is reserved for other uses.

Figure 2C:
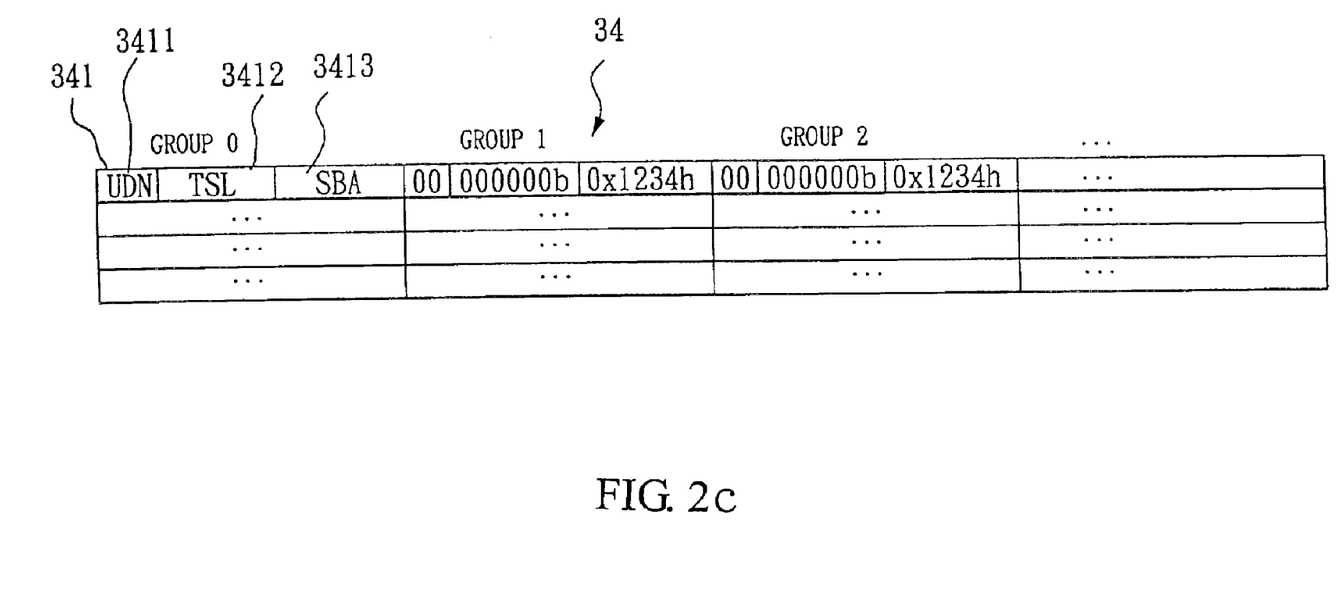
FIG. 2c is a diagram of a temporal MCF index table according to the invention.

With reference to FIG. 2c, there is shown a diagram of the temporal MCF index table 34. The temporal MCF index table 34 comprises a plurality of MCF groups 341, each comprising a using device number (UDN) 3411, a table searching length (TSL) 3412, and a searching begin address (SBA) 3413. The MCF group 341 corresponds to the MGN 545 shown in FIG. 2b. In a case that the MCF 5411 corresponding to the target MTN 544 does not exist in the temporal MCF table 32 (see FIG. 1), it is possible of directly searching and finding at least one MCF including a target MCF in the system management table 54 based on the temporal MCF index table 34, and loading the found at least one MCF into the temporal MCF table 32. For example, MCF group 341 is [00_001111b 0x1234h], in which '00' represents that the corresponding MCF table 541 is stored in the non-volatile memory 5 (see FIGS. 1 and 2a); '0x1234h' represents the searching begin address (SBA); and '001111' represents the TSL of a table to be searched. Hence, a MCF table 541 in the first non-volatile memory 5 is searched, and the searching range is from 0x1234h to 0x1244h (001111b+ 0x1234h=0x1244h). Alternatively, the above process for searching at least one MCF including a target MCF in the system management table 54 can be carried out by a hash finction searching or other searching method.

Figure 3:
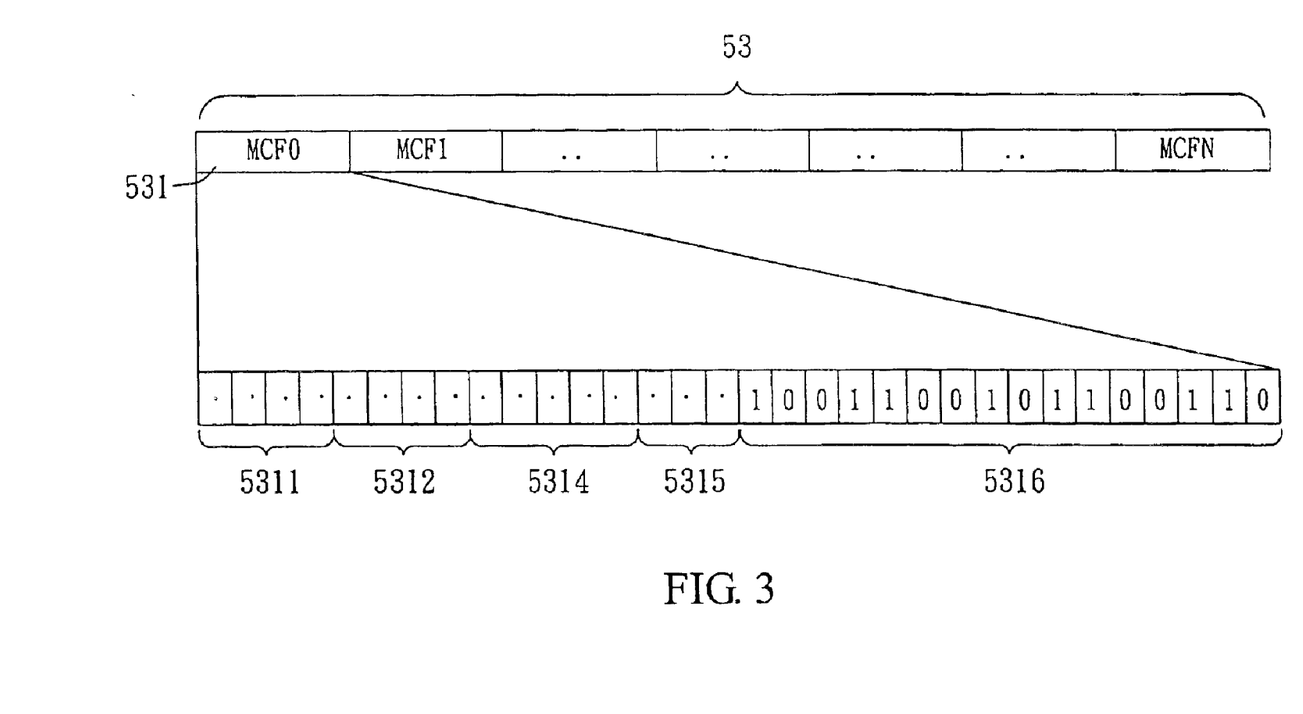
FIG. 3 is a diagram of a second configuration of the MCF table and data format of the MCF thereof according to the invention.

With reference to FIG. 3, there is shown a diagram of a second configuration of the MCF table and the data format of the MCF thereof according to the invention. The system management table 54 (see FIG. 1) comprises a plurality of MCF tables 548, each including a plurality of MCFs 5481. Each MCF 5481 comprises a data unit state (DUS) 5482, a MCF priority flag (MPF) 5483, a MTN 5484, other block information 5485, and a MPBA 5486, in which the MPF 5483 is substantially the same as the MTF 543 of FIG. 2a for remarking the MTN 5484.

Figure 4:
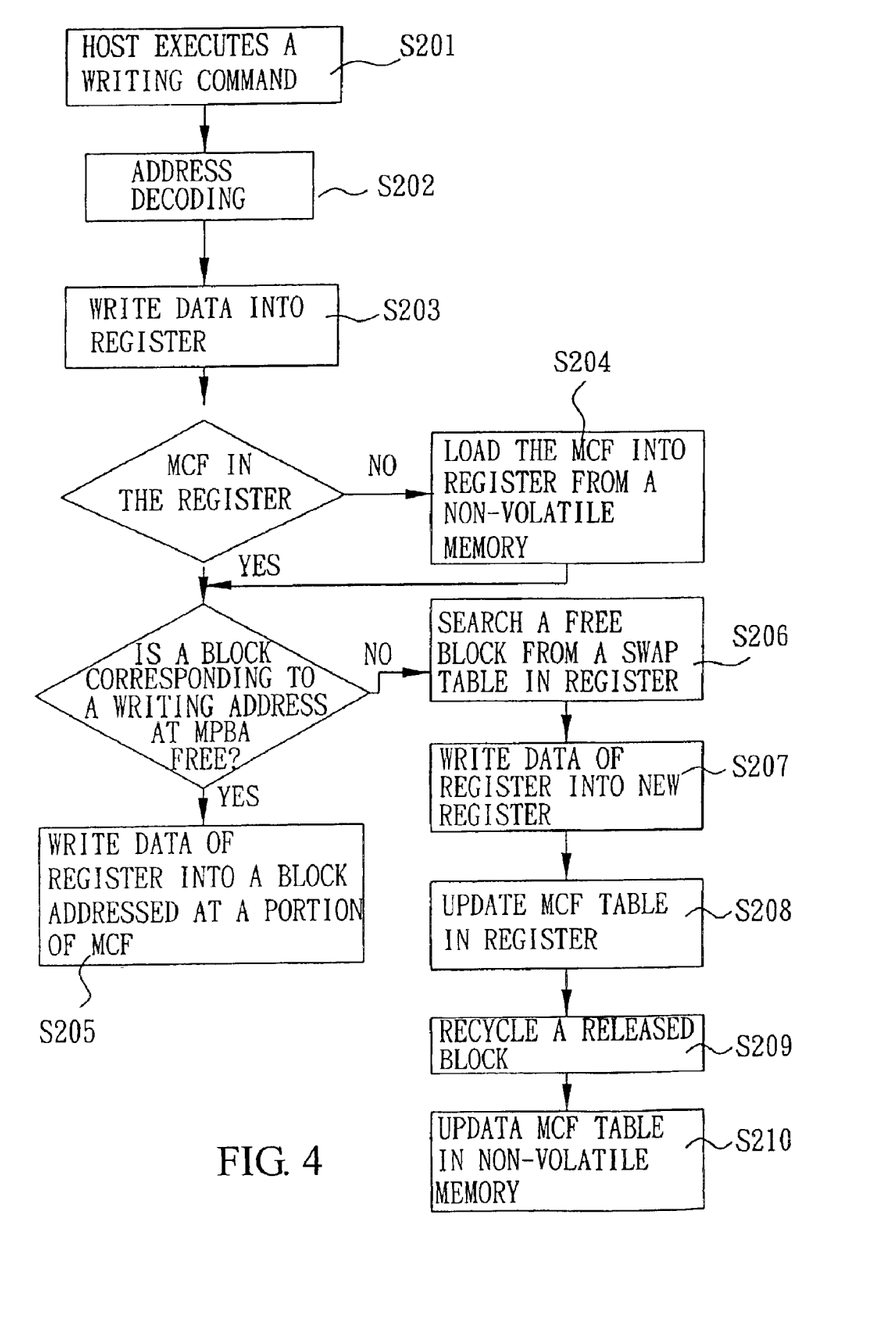
FIG. 4 is flow chart illustrating a process of data writing according to the invention.

FIG. 4 is flow chart illustrating a process of writing data from the host 1 to the storage system 2 according to the invention. Also with reference to FIGS. 1 and 2a, and FIG. 5 that illustrates the process of data writing according to the first embodiment of the invention, the host 1 first executes a writing command to the storage system 2 at an address 0x11021 in which there is only one data writing (step S201). Next, an address decoding (i.e., logical address conversion) is performed for obtaining a logical writing destination address corresponding to the writing command (step S202). The logical writing destination address has a MCFN 5411.

Figure 5:
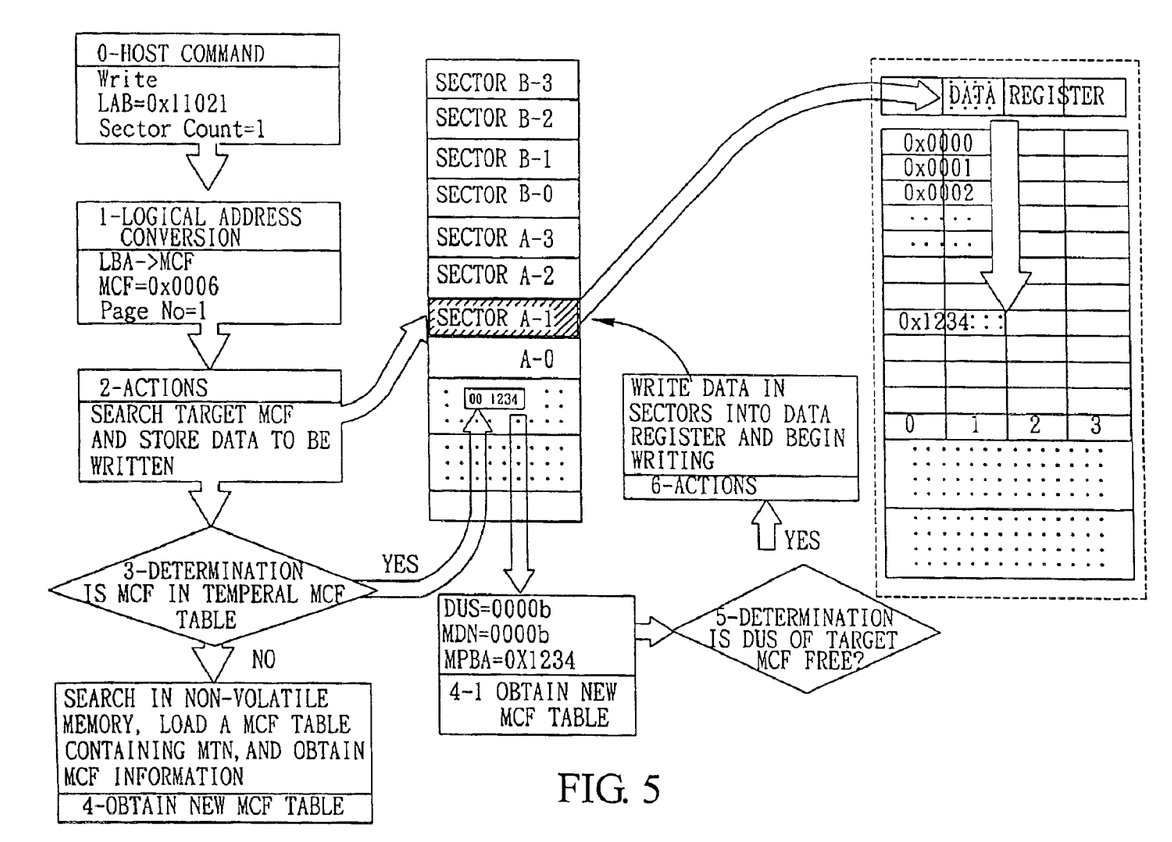
FIG. 5 is flow chart illustrating a detail process of data writing according to a first preferred embodiment of the invention.

Next, the target data is written into the register 2 and a search on a target MCF is performed (MCFN is 0x0006) (step S203). If the target MCF does not exist in the MCF table 32, the temporal MCF index table 34 is used to search the MCF table including the target MCF in the system management table 54 for obtaining MCF information (step S204). If the target MCF exists, MCF information can be obtained. MCF information comprises DUS 5412 (0000b), MDN 5413 (0000b), and MPBA 5414 (0x1234).

Then, the DUS 5412 is used to determine the writing state of the physical mapping block corresponding to the target MCF. If the first bit of the DUS 5412 is in a logical high state (i.e., 1) it indicates that the first page of the physical mapping block is not free. On the contrary, if the first bit of the DUS 5412 is in a logical low state (i.e., 0), it represents that the first page of the physical mapping block is free and data writing is permitted. In response, one target data stored in the register is written into a second page (e.g., Page 1) in the physical mapping block having a physical address of 1234h (step S205). Alternatively, if one bit of the DUS 5412 is in a logical high state, it represents that the physical mapping block is not free. As such, data is required to be written into a free swap block.

Figure 6:
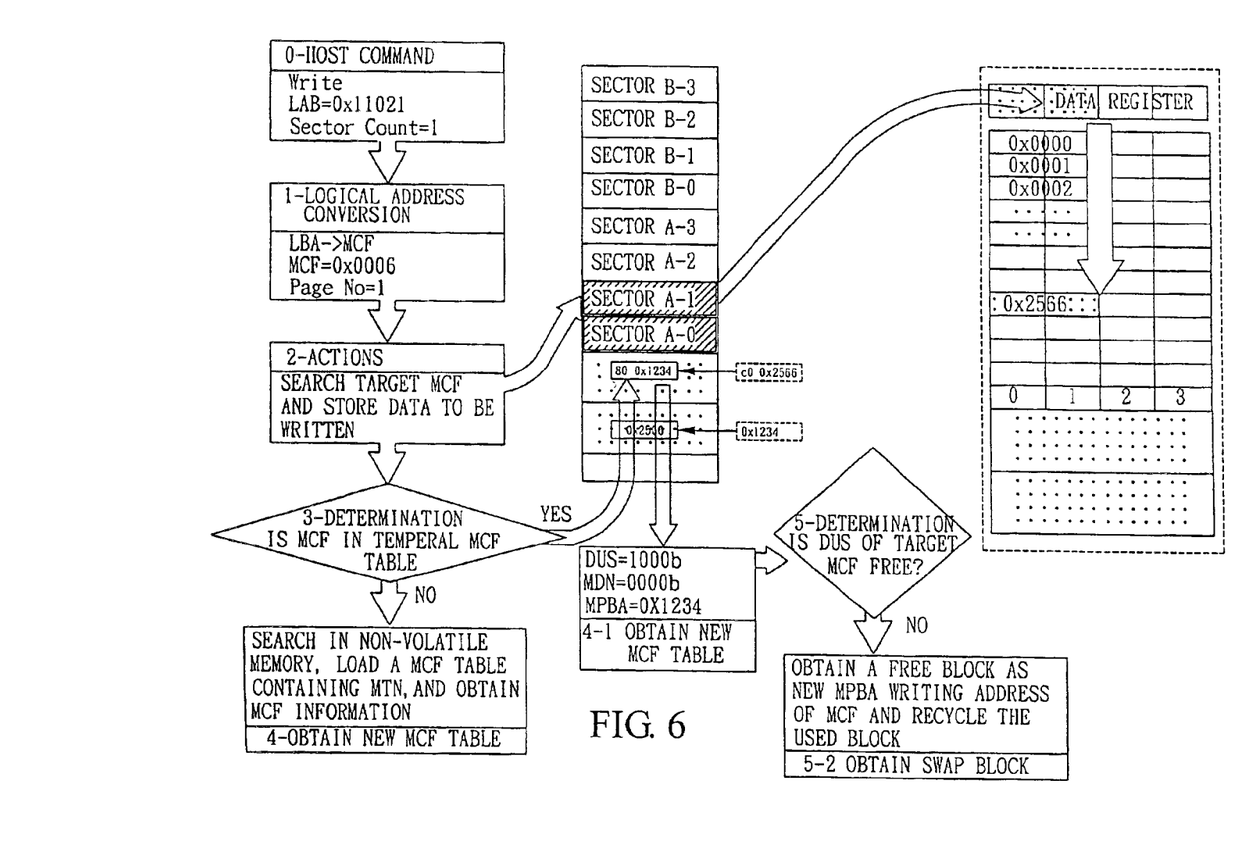
FIG. 6 is flow chart illustrating a detail process of data writing according to a second preferred embodiment of the invention.

With reference to FIG. 6, there is shown a second preferred embodiment of the present invention. Also with reference to FIGS. 1, 2a, and 4, it is shown that the block corresponding to the physical writing address is not free, and a data writing is performed via at least one swap block. The process of writing target data of this second embodiment is similar to that of the first embodiment. The only difference is that the DUS 5412 of the target MCF is 1000b; i.e., there is data in the block corresponding to a physical writing address (MPBA=80 0x1234) (at Page 0). The existing original data is moved to the first sector set A of the register 3.

If the original data in a block corresponding to the physical writing address overwrites data to be written (i.e., target data) in the register 3, the original data in the block has to be discarded. In this embodiment, the original data doesn't overwrite target data because the target data is written into the sector A-1 of the register 3 and the original data is written into the sector A-0 of the register 3. Each MCF corresponds to at least one swap block address (see FIG. 2a). As such, a valid free block is obtained via a swap block address 547 directly corresponding to the target MCF. The obtained block is served as a new MPBA writing address of the target MCF (step S206). This can prevent data failure in case of an unexpected event (e.g., power out) while writing.

Figure 7:
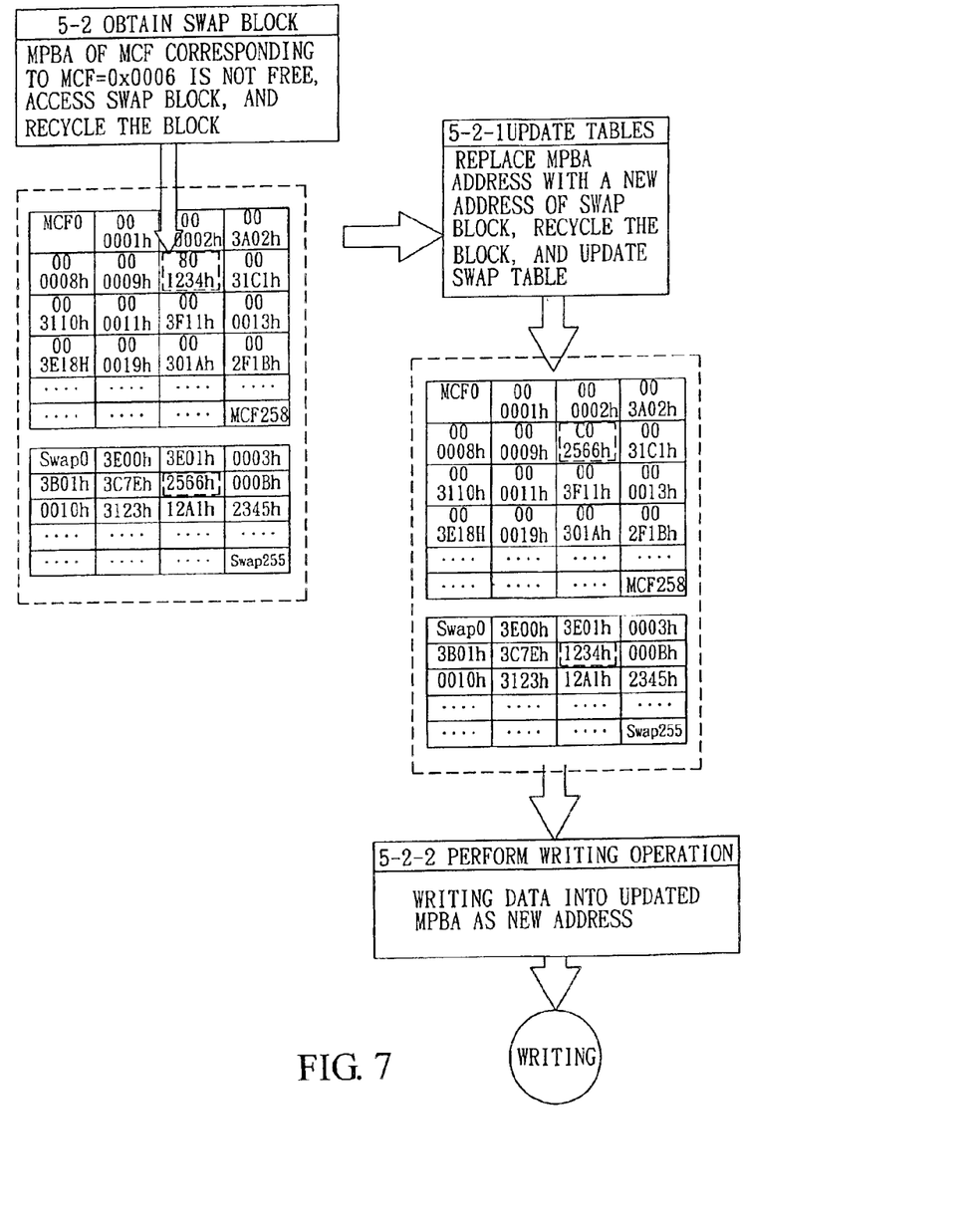
FIG. 7 is flow chart illustrating a process of writing data into an updated swap block according to the second preferred embodiment of the invention.

With reference to FIG. 7, there is shown a flow chart illustrating a process of writing data into an updated swap block according to the second preferred embodiment of the invention. A swap block address directly corresponding to the target MCF (1234h) is served as a new writing block of the target MCF (step S206). Next, data stored in the register 3 (i.e., at sectors A-0 to A-1) is written into the Page 0 to Page 1 of the new swap block (2566h) respectively (step S207). MPBA 5414 of MCF 5411 (0x0006) in temporal MCF table 32 of the register 3 is updated. That is, MPBA 5414 in MCF having a value of 0x0006 in MCF 5411 of the original temporal MCF table 32 is updated as 2566h (step S208). Next, block at 1234h is released to become a free swap block. Also, the swap block address 547 is updated as 1234h for providing a swap block for a next use. Moreover, the swap block address can be recycled for increasing an access efficiency of the swap block (step S209).

Next, an updating of the system management table 54 is performed. In detail, a swap block at the same MCF table group is obtained. A remark on MTF 543 is performed to represent a priority of MCF table having the same number in the same group, so as to determine, when there exist two MCF tables having the same number of 544, which one is the most effective and most recently updated (step S210). In this embodiment, preferably three setting values $\alpha$, $\beta$, and $\gamma$ are used for determining the priority. Also, such $\alpha$, $\beta$, and $\gamma$ follow an algorithm: $\alpha$ has a priority lower than that of $\beta$; $\beta$ has a priority lower than that of $\gamma$; and $\gamma$ has a priority lower than that of $\alpha$.

The MTF 543 of the updated MCF table is remarked as $\beta$ when MTF 543 of the original MTN 544 in the system management table 53 is $\alpha$. As such, MTF 543 remarked as $\beta$ can be used to access the most recently updated MCF table ($\beta$) in a next access of MCF table. Furthermore, MTN 544 ($\alpha$) is treated as old information which will be overwritten by a next updating of swap block address 547, thereby achieving the purpose of recycle.

Data is first written into the data register 51 in the first non-volatile memory 5 when data in the register 3 is to be written into the first non-volatile memory 5. Next, data is written into a target block in the first non-volatile memory 5. Hence, at least one page is taken as a writing unit of the first non-volatile memory 5 in each writing of target data. For example, if there are four records of data to be written. The first record of data is written into sector A-0 in the register 3 (see FIG. 1). After confirming that data is capable of writing into the corresponding block, data is written into a first page in data register 51 of the first non-volatile memory 5. Then, the second, third, and fourth records of data are written sequentially. The writing operation of each of the second, third, and fourth records of data is the same as that of the first record of data. As a result, data writing is performed by going through the data register 51 from the register 3.

Furthermore, the data in the data register 51 is written into the corresponding physical block at one time. Therefore, at least one page (at most four pages) of data in the data register 51 is written into the corresponding block per writing. This can achieve a set interleaving of writing data into the corresponding block of the first non-volatile memory 5.

The writing process implemented in either embodiment can use another MCF data format shown in FIG. 3. The extension table of the register 3 is implemented as a swap table 33. The swap table 33 comprises a plurality of free swap block addresses for being able to access a free swap block via the swap table 33. Furthermore, a counter is provided in the swap table 33 for counting the number of free blocks that have been accessed. The swap table 33 is loaded with free block addresses from the system management table 54 in the initial state. Thereafter, new added free blocks are used cyclically for increasing an access efficiency of the free blocks.

In view of the foregoing, it is known that the invention utilizes a decoded MCF information as a physical writing address. Further, a portion of the MCF information is used to determine whether there is data in the physical writing address of a block. If there is data in the corresponding block, a new swap block is taken out via a swap block address. At least one record of data in the register is then written into a data register in the corresponding non-volatile memory. Finally, data is written into the corresponding blocks sequentially. This can save time and thus increase the efficiency of writing data into a corresponding device. Furthermore, the time required to write data into the non-volatile memory section is reduced, and data can be prevented from losing in writing due to an unexpected event. In addition, it is possible of determining a writing state of a target block to be written without writing data into a redundancy of the target block.

Although the present invention has been explained in relation to its preferred embodiment, it is to be understood that many other possible modifications and variations can be made without departing from the spirit and scope of the invention as hereinafter claimed.

What is claimed is:

1. A non-volatile memory based storage system capable of directly overwriting without using redundancy comprising:
   at least one non-volatile memory including a plurality of blocks wherein at least one block is stored with a system management table having a plurality of mapping control field (MCF) tables, each having a plurality of MCFs; and
   a register for storing at least one target data to be written into said at least one non-volatile memory, the register including a temporal MCF table having at least one MCF of the system management table;
   wherein a host executes a writing command to write said at least one target data into said at least one non-volatile memory and the writing command includes a target MCF number for writing said at least target data into said at least one non-volatile memory based on a target MCF of the temporal MCF table corresponding the target MCF number.

2. The system as claimed in claim 1, wherein each MCF further comprises a table attribute (TA), a MCF table flag (MTF), a MCF table number (MTN), a MCF group number (MGN), at least one record of other information, and a plurality of swap blocks.

3. The system as claimed in claim 2, wherein each MCF further comprises a data unit state (DUS), a mapping device number (MDN), and a mapping physical block address (MPBA).

4. The system as claimed in claim 2, wherein the register further comprises a temporal MCF index table so that if the MCF corresponding to the target MTN does not exist in the temporal MCF table, a MCF table containing the target MCF is searched in the system management table via the temporal MCF index table and the MGNs and the MCF table is loaded into the temporal MCF table.

5. The system as claimed in claim 3, wherein if no data exists in at least one block corresponding to the MPBA of the target MCF, at least one target data stored in the register is written into at least one block; otherwise at least one swap block is accessed via at least one swap block address, at least one target data stored in the register is written into at least one swap block, and at least one swap block address and the MPBA of the target MCF are updated.

6. The system as claimed in claim 5, wherein the updated at least one swap block address is used to update the system management table, and a plurality of setting values are used to remark the MTF of the updated MCF table and the plurality of setting values are used for determining a priority of the MCF.

7. The system as claimed in claim 6, wherein the plurality of setting values comprises first, second, and third setting values with the first setting value smaller than the second setting value, the second setting value smaller than the third setting value, and the third setting value smaller than the first setting value.

8. The system as claimed in claim 7, wherein if the target MCF in the MTF of the system management table is set as the first setting value, the updated MPF of the MCF is remarked as the second setting value.

9. The system as claimed in claim 2, wherein the MDN is used to directly correspond the corresponding MCF to one non-volatile memory.

10. The system as claimed in claim 1, wherein each MCF further comprises a data unit state (DUS), a MCF priority flag (MPF), a mapping table number (MTN), and a mapping physical block address (MPBA), and the register further comprises a swap table having a plurality of swap block addresses of each non-volatile memory.

11. The system as claimed in claim 10, wherein if the MCF corresponding to the target MTN does not exist in the temporal MCF table, at least one MCF containing the target MCF is loaded from the system management table into the temporal MCF table.

12. The system as claimed in claim 10, wherein if no data exists in at least one block corresponding to the MPBA of the target MCF, at least one target data stored in the register is written into at least one block; otherwise at least one swap block is accessed via the swap block address, at least one target data stored in the register is written into at least one swap block, and at least one swap block address and the MPBA of the target MCF are updated.

13. The system as claimed in claim 10, wherein the updated at least one swap block address is used to update the system management table, and a plurality of setting values are used to remark the MTF of the updated MCF table and the plurality of setting values are used to determine a priority of the MCF.

14. The system as claimed in claim 10, wherein the DUS of the target MCF to be written is taken as a writing information state of at least one block corresponding to the MPBA.

15. A writing method for allowing a host to directly overwrite a non-volatile memory based storage system without using a redundancy, the storage system including a register and at least one non-volatile memory having a plurality of blocks, the at least one block being used for storing a system management table including a plurality of mapping control field (MCF) tables, each having a plurality of MCFs, a table attribute (TA), a MCF table flag (MTF), a MCF table number (MTN), a MCF group number (MGN), and a plurality of swap block addresses, each MCF having a mapping physical block address (MPBA), the register having a temporal MCF table including at least one MCF of the system management table, the writing method comprising the steps of:

(A) decoding a writing command from the host to obtain a logical writing destination address corresponding to the writing command wherein the logical writing destination address comprises the MCF number (MCFN) of a target MCF;

(B) writing target data from the writing command into the register;

(C) if the target MCF does not exist in the temporal MCF table, directly searching at least one MCF table containing the target MCF in the system management table based on a temporal MCF index table and a plurality of MGNs, and loading the at least one MCF table into the temporal MCF table;

(D) taking the MPBA of the target MCF as a physical writing address of the at least one non-volatile memory;

(E) if no data exists in at least one block corresponding to the physical writing address, writing at least one target data stored in the register into at least one block corresponding to the physical writing address; and (F) if data exists in at least one block corresponding to the physical writing address, taking at least one swap block out via at least one swap block address, writing said at least one target data stored in the register into said at least one swap block, and updating the temporal MCF table by the at least one swap block address.

16. The method as claimed in claim 15, wherein in step (F), data of at least one block corresponding to the physical writing address is written into the register and thereafter the target data stored in the register is written into the at least one swap block.

17. The method as claimed in claim 15, further comprising a step of (G) fir updating one of the MCFs in the system management table by the at least one swap block, and remarking the MTF of the MCF in the updated MCF table.

18. The method as claimed in claim 15, wherein the TA comprises a data unit state (DUS) taken as a writing information state of at least one block corresponding to the MPBA.

* * * * *